United States Patent
Zou et al.

(10) Patent No.: US 9,064,349 B2
(45) Date of Patent: Jun. 23, 2015

(54) COMPUTER-IMPLEMENTED IMAGE COMPOSITION METHOD AND APPARATUS USING THE SAME

(71) Applicant: Tencent Technology (Shenzhen) Company Limited, Shenzhen, Guangzhong (CN)

(72) Inventors: Difei Zou, Shenzhen (CN); Jun Huang, Shenzhen (CN); Xuehui Wang, Shenzhen (CN); Shengwei Lin, Shenzhen (CN); Deliang Zhu, Shenzhen (CN); Yusheng Zhong, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 25 days.

(21) Appl. No.: 14/135,056

(22) Filed: Dec. 19, 2013

(65) Prior Publication Data

US 2014/0105519 A1    Apr. 17, 2014

Related U.S. Application Data

(63) Continuation of application No. PCT/CN2013/078698, filed on Jul. 2, 2013.

(30) Foreign Application Priority Data

Jul. 4, 2012   (CN) .......................... 2012 1 0229014

(51) Int. Cl.
*G06K 9/36*     (2006.01)
*G06T 11/60*    (2006.01)
*H04N 1/387*    (2006.01)

(52) U.S. Cl.
CPC .............. *G06T 11/60* (2013.01); *H04N 1/3873* (2013.01)

(58) Field of Classification Search
None
See application file for complete search history.

(56) References Cited

U.S. PATENT DOCUMENTS

| 8,369,633 | B2 | 2/2013 | Lu et al. |
| 2004/0218834 | A1* | 11/2004 | Bishop et al. ................. 382/299 |
| 2010/0272184 | A1* | 10/2010 | Fishbain et al. ......... 375/240.16 |
| 2011/0096990 | A1 | 4/2011 | Lu et al. |
| 2012/0328210 | A1* | 12/2012 | Fattal et al. ................... 382/264 |

FOREIGN PATENT DOCUMENTS

| CN | 1980334 A | 6/2007 |
| CN | 101242512 A | 8/2008 |
| CN | 101677386 A | 3/2010 |
| CN | 101742324 A | 6/2010 |
| WO | 2012071147 A1 | 5/2012 |

OTHER PUBLICATIONS

International Search Report issued in PCT/CN2013/078698 mailed on Oct. 17, 2013.

* cited by examiner

*Primary Examiner* — Phuoc Tran
(74) *Attorney, Agent, or Firm* — Brinks Gilson & Lione

(57) ABSTRACT

A computer-implemented image composition method and apparatus, wherein, after a user selects a base image from a plurality of sequential images, and specifies an area to be modified, the content of the specified area in the base image is replaced with the content of a corresponding area in the remaining images one by one, and the base image after the replacement is output for a user's previewing and determination. It is possible to improve the quality of the images sequentially captured by applying the present disclosure.

18 Claims, 3 Drawing Sheets

COMPUTER-IMPLEMENTED IMAGE COMPOSITION METHOD AND APPARATUS USING THE SAME

CROSS-REFERENCE TO RELATED APPLICATIONS

This application is a continuation application of PCT Patent Application No. PCT/CN2013/078698, entitled "COMPUTER-IMPLEMENTED IMAGE COMPOSITION METHOD AND APPARATUS USING THE SAME" filed on Jul. 2, 2013, which claims priority to a Chinese Patent Application No. 201210229014.1, entitled "IMAGE COMPOSITION METHOD AND APPARATUS," filed on Jul. 4, 2012, both of which are incorporated by reference in their entirety.

FIELD OF THE TECHNOLOGY

The subject matter disclosed herein relates to the field of image processing, and in particular to a computer-implemented image composition method and apparatus using the computer-implemented image composition method.

BACKGROUND

As smart cell-phones become more and more popular, more and more cell-phones are configured with cameras. It becomes a part of life to take pictures of life and landscape anywhere and anytime by a camera within the cell-phone. However, in comparison with pro cameras, the performance of the cameras within the cell-phones is relatively lower and thus the quality of the shot pictures needs to be improved.

Typically, it is possible to improve image quality by applying a picture rendering process to each picture, e.g. adjusting the color of the picture with various filters such as a monochromatic filter or a warming filter.

SUMMARY OF THE INVENTION

In view of the above, an aspect of the present disclosure provides a computer-implemented image composition method capable of improving the quality of images sequentially captured.

The computer-implemented image composition method comprises: receiving a first instruction, by a receiving module having a processor, the first instruction comprising an image identifier and area information, wherein the image identifier identifies a first image from a plurality of sequential images as a base image and the area information specifies an area to be modified; selecting a second image from the plurality of sequential images other than the base image, and if the selection fails, ending the image composition, otherwise, replacing the content of the specified area in the base image with the content in a corresponding area of the second image, and outputting the base image after the replacement.

According to another aspect of the present disclosure, an image composition apparatus comprises a first storage module configured to store, in a non-transitory memory, a plurality of sequential images;

an instruction receiving module using a processor and configured to receive a first instruction and a second instruction, the first instruction comprising an image identifier and area information, wherein the image identifier identifying a first image from a plurality of sequential images as a base image and the area information specifies an area to be modified;

an image selecting module using a processor and configured to select a second image from the plurality of sequential images other than the base image when the instruction receiving module receives the image composition instruction or receives a second notice from an image replacing module, and if the selection fails, end the image composition, otherwise, send a first notice to the image replacing module; and the image replacing module using a processor and configured to replace the content of the specified area in the base image with the content in a corresponding area of the second image, and output the base image after the replacement upon receiving the first notice from the image selecting module, and when the instruction receiving module receives the second instruction, and the second instruction is a non-acknowledge (non-ACK) instruction, send the second notice to the image selecting module, but if the second instruction is a acknowledge (ACK) instruction, save the base image after the replacement into a second storage module.

According to another further aspect of the present disclosure, a non-transitory computer-readable storage medium comprises a set of instructions for compositing sequential images, the set of instructions to direct at least one processor to perform acts of: receiving a first instruction, the first instruction comprising an image identifier and area information, wherein the image identifier identifies a first image from a plurality of sequential images as a base image and the area information specifies an area to be modified;

selecting a second image from the plurality of sequential images other than the base image, and if the selection fails, ending the image composition, otherwise, replacing the content of the specified area in the base image with the content in a corresponding area of the second image, and outputting the base image after the replacement;

receiving a second instruction, and if the second instruction is a non-ACK instruction, returning to the selecting step, but if the second instruction is a ACK instruction, saving the base image after the replacement.

As can be seen from the above solutions, in the above aspects, after a user selects a base image from a plurality of images sequentially captured, and specifies the area to be modified, the content of the specified area in the base image is replaced with the content in a corresponding area of the remaining images one by one, and the base image after the replacement is output for a user's previewing and determination. It is possible to improve the quality of the images sequentially captured by applying various aspects of the present disclosure.

Other aspects or embodiments of the present disclosure can be understood by those skilled in the art in light of the description, the claims, and the drawings of the present disclosure.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure.

In practical applications, a sequential shooting function (also referred to sequential capturing function) may be used when images are captured by a cell-phone. Usually, only minor differences, such as a difference between eye closing and opening, exist among a plurality of images sequentially captured.

Figure 1:
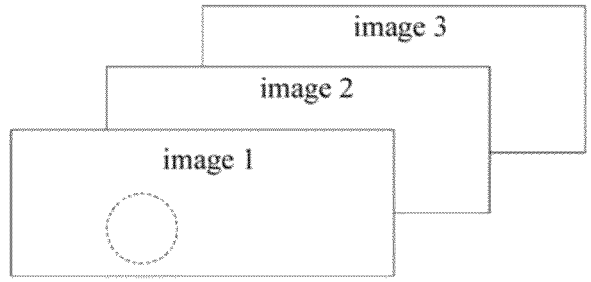
FIG. 1 is a schematic diagram of a plurality of sequential images.

FIG. 1 is a schematic diagram of a plurality of sequential images, including three images for example as image 1, image 2, and image 3. FIG. 1 is a simplified diagram according to one embodiment of the present invention. This diagram is merely an example, which should not unduly limit the scope of the claims. One of ordinary skill in the art would recognize many variations, alternatives, and modifications. The specific content of the images are not shown, and in broadest scope as understood by ordinarily skilled they may be any content captured by the camera. A user can select one image such as image 1 from the three images as a base image, and specify a modification area in the image. The pre-specified modification area can be a closed area(s) in any shape, such as a circle as shown in FIG. 1 by the dash line, depending on the need of a user. Then, the content of the pre-specified modification area in the image 1 can be replaced with the content in the image 2 corresponding to the pre-specified modification area, and the image 1 after replacement is presented to a user. If a user is not satisfied with the image 1 after replacement, the content of the pre-specified modification area in the image 1 can then be replaced with the content in the image 3 corresponding to the pre-specified modification area, and the image 1 after replacement is presented to a user. If there are also images 4, 5 . . . , the above processes can be repeated until a user is satisfied with the resulting image 1.

Figure 2:
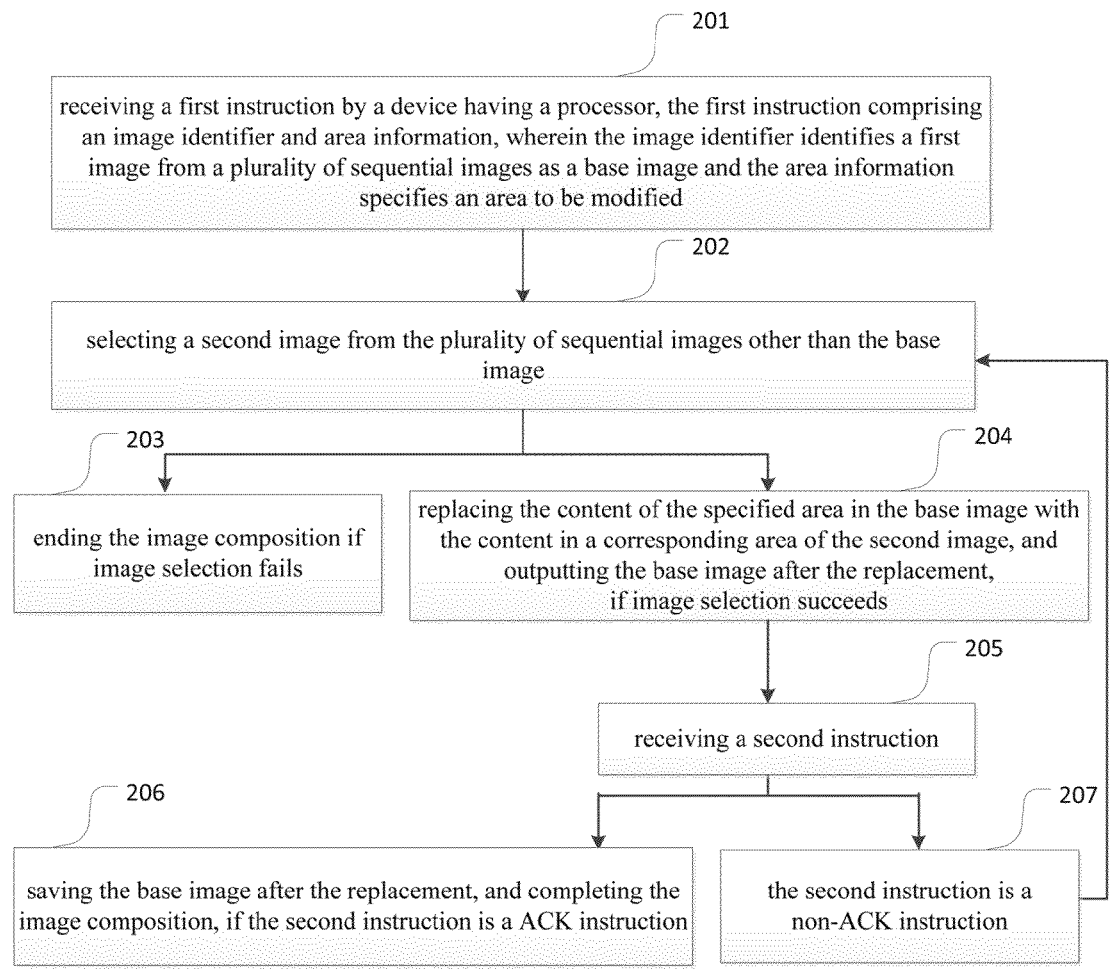
FIG. 2 is a schematic flowchart of a computer-implemented image composition method according to an embodiment of the present disclosure.

FIG. 2 is a schematic flowchart of a computer-implemented image composition method according to an embodiment of the present disclosure, which begins with process 201. FIG. 2 is a simplified diagram according to one embodiment of the present disclosure. This diagram is merely an example, which should not unduly limit the scope of the claims. One of ordinary skill in the art would recognize many variations, alternatives, and modifications. An example computer may be a computing device capable of executing the image composition method of present disclosure. The computer may, for example, be a device such as a personal desktop computer or a portable device, such as a laptop computer, a tablet computer, a cellular telephone, or a smart phone. The computer may also be a server that connects to the above devices locally or via a network.

In process 201, a first image composition instruction is received, and the first instruction contains an image identifier of a base image selected by a user from a plurality of sequential images, and information on a pre-specified modification area. Herein, a user can firstly select the most satisfying image from the plurality of sequential images as the base image, specify an area to be modified, and trigger the image composition process. In one embodiment, a user can launch an image composition interference, determine the base image, draw an image area to be modified on the base image displayed on the screen by a finger, and then click an button or menu option for triggering the image composition process to generate the image composition instruction.

The image identifier contained in the image composition instruction can be, but not limited to, an image name, an image number, or the like of the base image.

The pre-specified modification area is a closed area, which can be for example a circle, a rectangle, an ellipse, or a closed area in any other shape. The modification area specified by a user can be represented by the coordinates of a plurality of points on the edges of the pre-specified modification area with any point in the image as the coordinate origin. In this case, the information on the pre-specified modification area includes the coordinates of a plurality of sample points on the edge of the pre-specified modification area. In practice, when the pre-specified modification area is a relatively regular shape such as a circle, a rectangle, an ellipse, or the like, the modification area specified by a user may not be represented by the coordinates of a plurality of sample points on the edges of the pre-specified modification area. For example, when the pre-specified modification area is a circle, it suffices to record the coordinates of the circle center and the radius. In this case, the information on the pre-specified modification area includes the coordinates of the circle center and the radius.

In process 202, one image which has not been selected is selected from the plurality of sequential images other than the base image. After the base image and the pre-specified modification area thereof are determined, the plurality of sequential images other than the base image can be selected one by one, and the image composition operation can be performed. When an image is selected from the plurality of sequential images other than the base image, only one that has not been selected until now can be selected, and those that have been selected will not be selected again. If the image selection fails, the process turns to the process 203, and if the image selection succeeds, the process proceeds to the process 204.

In process 203, the image composition process is ended. In this process, the image selection fails, it means that all the images have been selected, and the image replacement and preview have been performed accordingly, so the image composition process does not need to be continued any more.

In process 204, the content of the pre-specified modification area in the base image is replaced with the content in the selected image corresponding to the pre-specified modification area, and the base image after the replacement is output. In this process, the image selection succeeds, and therefore the selected image and the base image can be composed. When the content of the pre-specified modification area in the base image is replaced with the content in the selected image corresponding to the pre-specified modification area based on the information on the pre-specified modification area, the coordinate system of the selected image should be identical to that of the base image.

In process 205, another operation instruction from a user is received. After the base image after the replacement is output, a user can see the effect of the image after the replacement, and give another operation instruction. In one embodiment, a button or menu option for triggering confirmation of replacement or a button or menu option for triggering non-confirmation of replacement may be provided. When a user is satisfied with the replacement effect, he/she may click the button or menu option for triggering confirmation of replacement to generate the ACK instruction. When a user is not satisfied with the replacement effect, he/she may click the button or menu option for triggering non-confirmation of replacement to generate a non-ACK instruction. If the another operation instruction from a user is the ACK instruction, the process proceeds to the process 206. If the another operation instruction from a user is the non-ACK instruction, the process proceeds to the process 207.

In process 206, the base image after the replacement is saved, and the image composition is completed. In this process, since the received another operation instruction from a user is the ACK instruction, the base image after replacement can be saved, and the image composition is completed.

In process 207, since the another operation instruction from a user is the non-ACK instruction, the process returns to the process 202 to continue the image composition process. In this process, the received another operation instruction from a user is the non-ACK instruction, so the process can return to the process 202 that another image can be selected to try the image composition again.

After the base image after replacement is output, a user may see the effect of the image after replacement, and give another operation instruction. In one embodiment, a button or menu option for triggering confirmation of replacement or a button or menu option for triggering non-confirmation of replacement may be provided. When a user is satisfied with the replacement effect, he/she may click the button or menu option for triggering confirmation of replacement to generate the ACK instruction. When a user is not satisfied with the replacement effect, he/she may click the button or menu option for triggering non-confirmation of replacement to generate the non-ACK instruction.

In one embodiment, a user may cancel the image composition process during the image composition. In a specific implementation, a button or menu option for triggering cancellation of the image composition may be provided. When a user needs to cancel the image composition, he/she may click the button or menu option for triggering cancellation of the image composition to generate a cancel instruction.

Therefore, one embodiment of the present disclosure as shown in FIG. 2, further comprises, after the another operation instruction from a user is received, that the base image is restored and the image composition process is ended if the another operation instruction from a user is the cancel instruction.

After the image selection fails and before the image composition is ended, it is needed to determine whether the current base image is the base image after replacement. If it is so, the base image needs to be restored to avoid the base image being wrongly modified.

In one embodiment, in order to avoid the base image being wrongly modified, the base image may be restored after the effect of the image composition is denied by the use each time. Therefore, the process 207, after determining that the another operation is the non-ACK instruction and before returning to the process 202, also comprises a process of restoring the base image.

It is noted that, in the above embodiments, the processes 201-207 can complete the modification to one pre-specified modification area of the base image. If there is a further area to be modified, a new modification area can be specified and a new round of image modification process may be started.

The computer-implemented image composition method according to one embodiment of the present disclosure is described in detail in the above.

According to another embodiment of the present disclosure, the present disclosure also provides an image composition apparatus.

Figure 3:
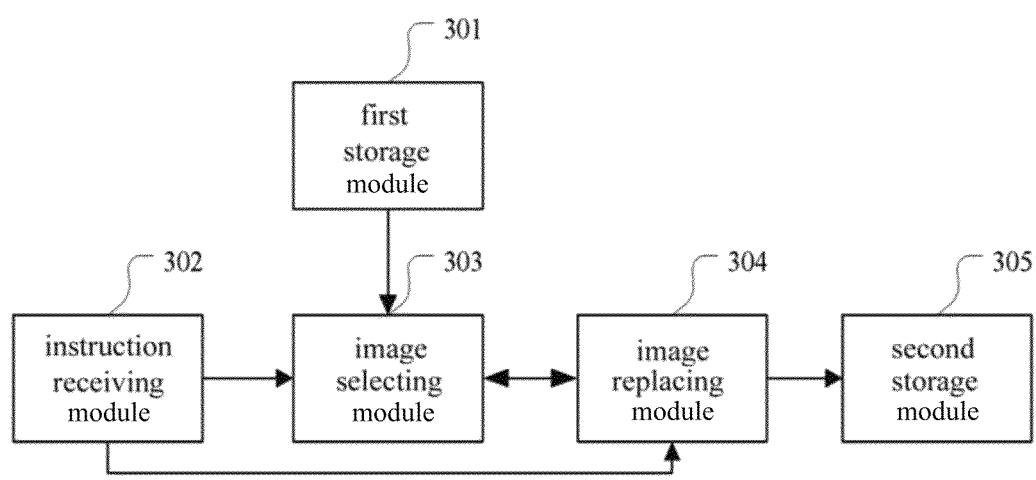
FIG. 3 is a schematic diagram of structure of an image composition apparatus according to an embodiment of the present disclosure.
Figure 4:
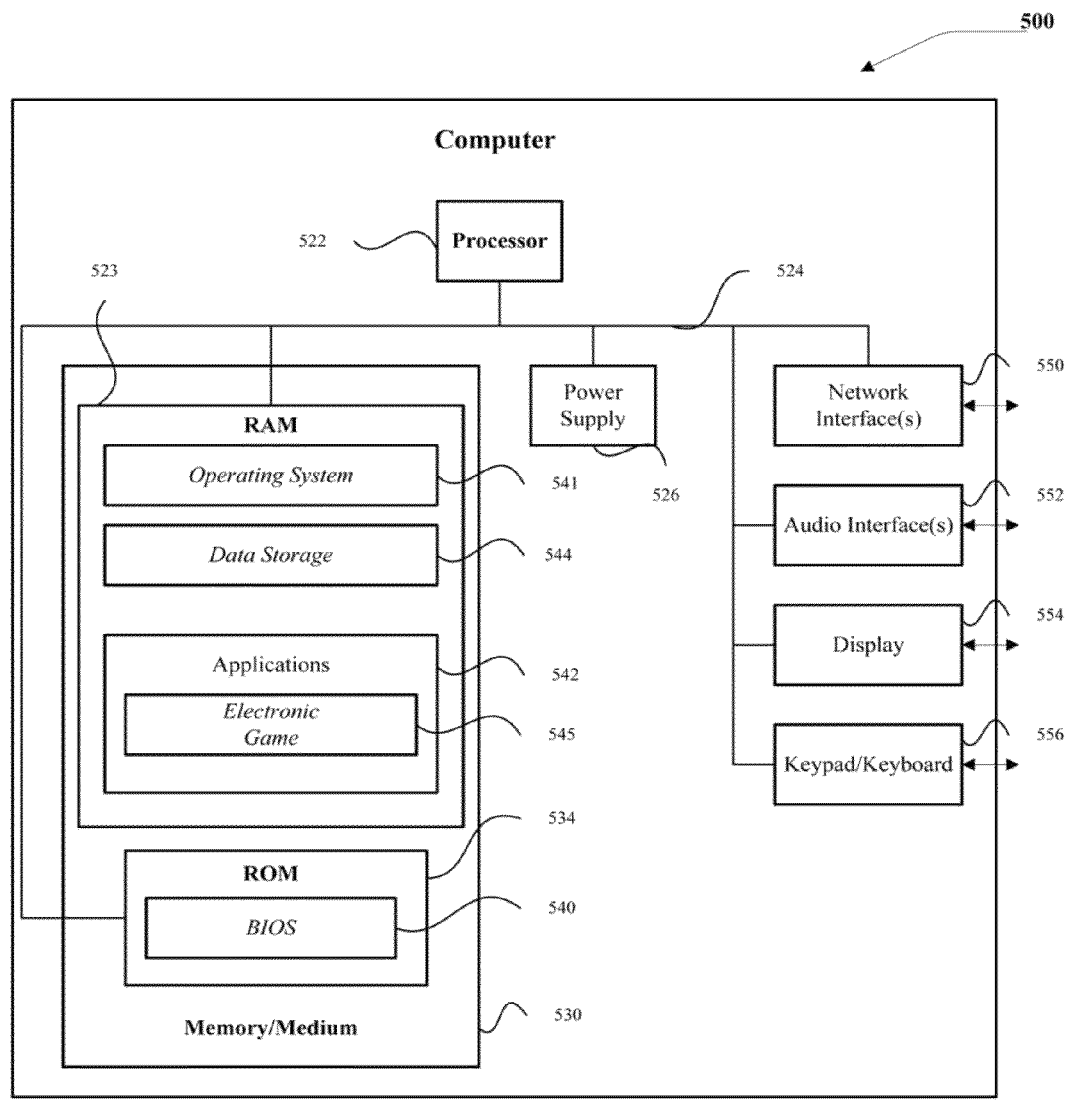
FIG. 4 is a schematic diagram illustrating an example embodiment of a computer.

FIG. 3 is a schematic structural diagram of an image composition apparatus according to another embodiment of the present disclosure. The image composition apparatus comprises a first storage module 301, an instruction receiving module 302, an image selecting module 303, an image replacing module 304, and a second storage module 305. FIG. 3 is a simplified diagram according to one embodiment of the present invention. This diagram is merely an example, which should not unduly limit the scope of the claims. One of ordinary skill in the art would recognize many variations, alternatives, and modifications.

The first storage module 301 is configured to store a plurality of images sequentially captured by a user.

The instruction receiving module 302 is configured to receive an image composition instruction, which contains an image identifier of a base image selected by a user from the plurality of sequential images, and information on a pre-specified modification area. The instruction receiving module 302 also receives another operation instruction from a user.

The image selecting module 303 is configured to select one image from the sequential plurality of images other than the base image when the instruction receiving module receives the image composition instruction from a user or receives a second notice from the image replacing module 304. If the selection fails, the image composition process is ended, otherwise, a first notice is sent to the image replacing module 304.

The image replacing module 304 is configured to replace the content of the pre-specified modification area in the base image with the content in the selected image corresponding to the pre-specified modification area, and output the base image after replacement upon receiving the first notice from the image selecting module 302. When the instruction receiving module 302 receives the another operation instruction from a user, if the another operation instruction is a non-ACK instruction, the image replacing module 304 sends the second notice to the image selecting module 303. If the another operation instruction is the ACK instruction, the image replacing module 304 saves the base image after replacement into the second storage module 305.

In the above apparatus, according to an embodiment of the present disclosure, when the instruction receiving module 302 receives the another operation instruction from a user, if the another operation instruction from a user is a cancel instruction, the image replacing module 304 restores the base image and ends the image composition process.

According to an embodiment of the present disclosure, after the image selection fails and before the image composition is ended, if the base image is the base image after replacement, the image selecting module 303 restores the base image.

According to an embodiment of the present disclosure, after it is determined that the another operation is the non-ACK instruction and before sending the second notice to the image selecting module 303, the image replacing module 304 restores the base image.

According to one embodiment of the present disclosure, the pre-specified modification area is a closed area in any shape, such as but not limited to a closed circular area, and the information on the pre-specified modification area includes coordinates of a plurality of sampling points on the edges of the pre-specified modification area. If the pre-specified modification area is the closed circular area, the information on the pre-specified modification area includes the coordinates of the circle center and the radius of the closed circular area.

According to one embodiment of the present disclosure, the computer-implemented image composition method shown in FIG. 2 may be a computer-implemented image composition method performed by respective modules in the image composition apparatus shown in FIG. 3. For example, the processes 201 and 205 shown in FIG. 2 may be performed by the instruction receiving module 302 shown in FIG. 3. The processes 202 and 203 shown in FIG. 2 may be performed by the image selecting module 303 in connection with the first storage module 301 shown in FIG. 3. The processes 204, 206 and 207 shown in FIG. 2 may be performed by the image replacing module 304 in connection with the second storage module 305 shown in FIG. 3.

According to another embodiment of the present disclosure, respective modules of the image composition apparatus shown in FIG. 3 may be partly or all combined into one or several other modules. Alternatively, one or some of the modules may be further divided into several functionally smaller modules. For example only, the first storage module 301 may be combined with the second storage module 305 into a single storage module, and the image selecting module 303 may be combined with the image replacing module 304 into a single image processing module. As such, the same operation may be realized without influencing the realization of the effects of the embodiments of the present disclosure.

According to another embodiment of the present disclosure, the image composition apparatus as shown in FIG. 3 may be constructed and the computer-implemented image composition method according to an embodiment of the present disclosure may be realized, by running a computer program including program codes which can perform the computer-implemented image composition method as shown in FIG. 2 on a general purpose computing device such as a computer comprising a processing element such as center processing module (CPU) and one or more non-transitory processor-readable storage media. The non-transitory processor-readable storage media may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media may store sets of instructions, or modules and/or modules that comprise the sets of instructions, for conducting operations described in the present application. The computer program may be recorded on for example the non-transitory processor-readable storage media, and may be loaded onto the above-mentioned computing device through the computer-readable recording medium for running on the computing device.

In conclusion, by applying the computer-implemented image composition method and the image composition apparatus according to various embodiments of the present disclosure, it is possible to easily keep the satisfying part of the images sequentially captured by a user to obtain a better image effect, so to improve the quality of the images sequentially captured, and thus the present disclosure is highly in practical use.

Various embodiments of the present disclosure are described in the above, but they are not intended to limit the scope of the present disclosure which is defined by the appending claims. Any modification, equivalent replacement, improvement, or the like performed without departing from the spirit and principle of the present disclosure should fall within the protection scope of the claims.

What is claimed is:

1. A computer-implemented image composition method for compositing sequential images, comprising:
    process A of: receiving a first image composition instruction from a user, by a receiving module having a processor, the first image composition instruction comprising an image identifier of a base image and information on a pre-specified modification area, wherein the image identifier of the base image indicating the base image selected from a plurality of sequential images;
    process B of: selecting a second image from the plurality of sequential images other than the base image, and if the selection fails, ending the image composition, otherwise, replacing the content of the pre-specified modification area in the base image with the content in a corresponding pre-specified modification area of the second image, and outputting the base image after the replacement;
    process C of: receiving a second operation instruction from a user, and if the second operation instruction is a non-ACK instruction, returning to the process B, but if the second operation instruction is a ACK instruction, saving the base image after the replacement.

2. The computer-implemented image composition method according to claim 1, further comprising, a process of restoring the base image and ending the image composition if the another operation instruction from a user is a cancel instruction.

3. The computer-implemented image composition method according to claim 1, further comprising, after the image selection fails and before ending the image composition, a process of restoring the base image if the base image is a base image after the replacement.

4. The computer-implemented image composition method according to claim 1, further comprising, after determining that the second instruction is a non-ACK instruction and before returning to the selecting step, restoring the base image.

5. The computer-implemented image composition method according to claim 1, wherein the pre-specified modification area is a closed area in any shape, and the information on the pre-specified modification area includes coordinates of a plurality of sampling points on the edges of the pre-specified modification area.

6. The computer-implemented image composition method according to claim 5, wherein the pre-specified modification area is a closed circular area, and the information on the pre-specified modification area includes the coordinates of a center and a radius of the closed circular area.

7. An image composition apparatus, comprising:
    a first storage module configured to store, in a non-transitory memory, a plurality of sequential images;
    an instruction receiving module using a processor and configured to receive a first image composition instruction and a second operation instruction, the first instruction comprising an image identifier and area information, wherein the image identifier identifies a first image from a plurality of sequential images as a base image and the area information specifies an area to be modified;
    an image selecting module using a processor and configured to select a second image from the plurality of sequential images other than the base image when the instruction receiving module receives the image composition instruction or receives a second notice from an image replacing module, and if the selection fails, end the image composition, otherwise, send a first notice to the image replacing module; and
    the image replacing module using a processor and configured to replace the content of the pre-specified modification area in the base image with the content in a corresponding area of the second image, and output the base image after the replacement upon receiving the first notice from the image selecting module, and when the instruction receiving module receives the second instruction, and the second instruction is a non-ACK instruction, send the second notice to the image selecting module, but if the second instruction is a ACK instruction, save the base image after the replacement into a second storage module.

8. The image composition apparatus according to claim 7, wherein when the instruction receiving module receives the second operation instruction from a user, and the second operation instruction from a user is a cancel instruction, the image replacing module restores the base image and ends the image composition.

9. The image composition apparatus according to claim 7, wherein after the image selection fails and before the image composition is ended, if the base image is a base image after the replacement, the image selecting module restores the base image.

10. The image composition apparatus according to claim 7, wherein after it is determined that the second instruction is a non-ACK instruction and before sending the second notice to the image selecting module, the image replacing module restores the base image.

11. The image composition apparatus according to claim 7, wherein the pre-specified modification area is a closed circular area, and the information on the pre-specified modification area includes coordinates of a plurality of sampling points on the edges of the pre-specified modification area.

12. The image composition apparatus according to claim 11, wherein the pre-specified modification area is a closed circular area, and the information on the pre-specified modification area includes the coordinates of the circle center and the radius of the closed circular area.

13. A non-transitory computer-readable storage medium comprising a set of instructions for compositing sequential images, the set of instructions to direct at least one processor to perform acts of:

process A of: receiving a first image composition instruction from a user, by a receiving module having a processor, the first image composition instruction comprising an image identifier of a base image and information on a pre-specified modification area, wherein the image identifier of the base image indicating the base image selected from a plurality of sequential images;

process B of: selecting a second image from the plurality of sequential images other than the base image, and if the selection fails, ending the image composition, otherwise, replacing the content of the pre-specified modification area in the base image with the content in a corresponding pre-specified modification area of the second image, and outputting the base image after the replacement; and process C of: receiving a second operation instruction from a user, and if the second operation instruction is a non-ACK instruction, returning to the process B, but if the second operation instruction is a ACK instruction, saving the base image after the replacement.

14. The non-transitory computer-readable storage medium according to claim 13, further comprising a process of restoring the base image and ending the image composition if the second operation instruction from a user is a cancel instruction.

15. The non-transitory computer-readable storage medium according to claim 13, further comprising, after the image selection fails and before ending the image composition, a process of restoring the base image if the base image is a base image after the replacement.

16. The non-transitory computer-readable storage medium according to claim 13, further comprising, after determining that the second instruction is a non-ACK instruction and before returning to the process B, a process of restoring the base image.

17. The non-transitory computer-readable storage medium according to claim 13, wherein the pre-specified modification area is a closed area, and the information on the pre-specified modification area includes coordinates of a plurality of sampling points on the edges of the pre-specified modification area.

18. The non-transitory computer-readable storage medium according to claim 17, wherein the pre-specified modification area is a closed circular area, and the information on the pre-specified modification area includes the coordinates of the circle center and the radius of the closed circular area.

* * * * *